(12) United States Patent
Wilson-Woodard (10) Patent No.: US 11,375,705 B1
(45) Date of Patent: Jul. 5, 2022

(54) PORTABLE INSECTICIDE DISPENSER

(71) Applicant: Pamela Wilson-Woodard, York, PA (US)

(72) Inventor: Pamela Wilson-Woodard, York, PA (US)

( * ) Notice: Subject to any disclaimer, the term of this patent is extended or adjusted under 35 U.S.C. 154(b) by 261 days.

(21) Appl. No.: 16/787,238

(22) Filed: Feb. 11, 2020

(51) Int. Cl.
*A01M 1/20* (2006.01)
*B05B 1/24* (2006.01)

(52) U.S. Cl.
CPC .............. *A01M 1/2038* (2013.01); *B05B 1/24* (2013.01)

(58) Field of Classification Search
None
See application file for complete search history.

(56) References Cited

U.S. PATENT DOCUMENTS

| | | | |
|---|---|---|---|
| 3,490,647 A | 1/1970 | Portyrata | |
| 4,415,797 A * | 11/1983 | Choustoulakis | B65D 83/72 392/394 |
| 5,825,975 A * | 10/1998 | Privas | B05B 12/00 392/404 |
| 6,143,313 A * | 11/2000 | Ito | A01N 25/18 424/409 |
| 7,540,433 B2 | 6/2009 | Fleming | |
| 8,430,337 B2 | 4/2013 | Pearce, III | |
| 10,099,842 B2 | 10/2018 | Baranowski | |
| D846,725 S | 4/2019 | Mecker | |
| 2010/0155399 A1 | 6/2010 | Wilson | |
| 2012/0234863 A1 | 9/2012 | Kahler | |

FOREIGN PATENT DOCUMENTS

WO    WO-2007071990 A1 *   6/2007   .......... A01M 1/2077

* cited by examiner

*Primary Examiner* — Joshua J Michener
*Assistant Examiner* — Nicole Paige MacCrate (57) ABSTRACT

The portable insecticide dispenser is an electromechanical device. The portable insecticide dispenser vaporizes an insecticide using a method selected from the group consisting of evaporation and sublimation. The portable insecticide dispenser diffuses the vaporized insecticide into the atmosphere. The portable insecticide dispenser comprises a housing, a control circuit, and an essential oil. The housing contains the control circuit and the essential oil. The essential oil is a lipid-based substance that contains a substance known to be an insecticide. The control circuit vaporizes the essential oil such that the insecticide forms a gas phase that mixes into the atmosphere. The control circuit further mechanically diffuses the gas phase of the insecticide into the atmosphere.

19 Claims, 7 Drawing Sheets

PORTABLE INSECTICIDE DISPENSER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of performing operations including spraying apparatus, more specifically, a spraying apparatus incorporating means to heat the fluent material.

SUMMARY OF INVENTION

The portable insecticide dispenser is an electromechanical device. The portable insecticide dispenser vaporizes an insecticide using a method selected from the group consisting of evaporation and sublimation. The portable insecticide dispenser diffuses the vaporized insecticide into the atmosphere. The portable insecticide dispenser comprises a housing, a control circuit, and an essential oil. The housing contains the control circuit and the essential oil. The essential oil is a lipid-based substance that contains a substance known to be an insecticide. The control circuit vaporizes the essential oil such that the insecticide forms a gas phase that mixes into the atmosphere. The control circuit further mechanically diffuses the gas phase of the insecticide into the atmosphere.

These together with additional objects, features and advantages of the portable insecticide dispenser will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable insecticide dispenser in detail, it is to be understood that the portable insecticide dispenser is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable insecticide dispenser.

It is therefore important that the claims be regarded as including such equivalent construction insofar as they do not depart from the spirit and scope of the portable insecticide dispenser. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
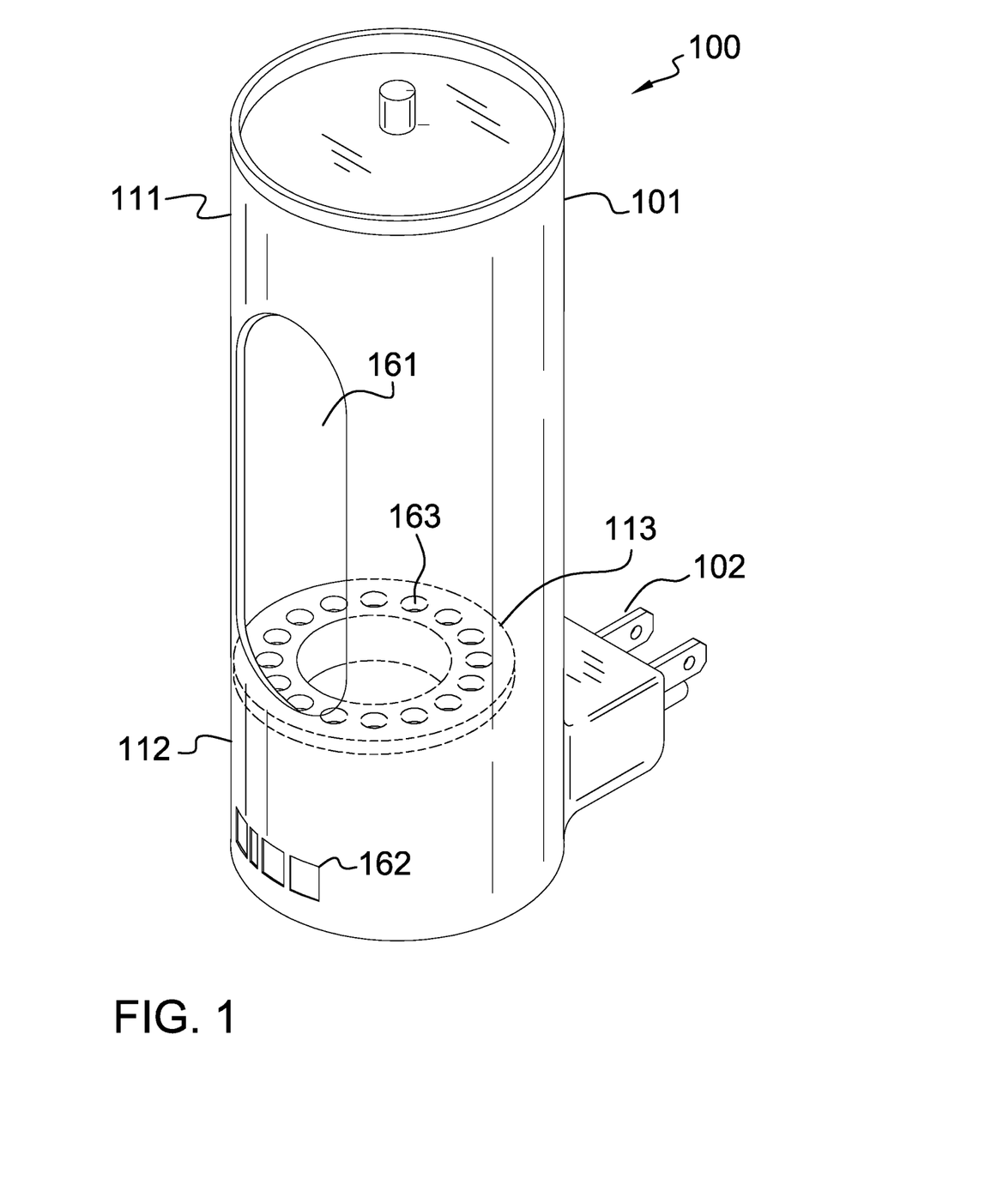
FIG. 1 is a perspective view of an embodiment of the disclosure.
Figure 2:
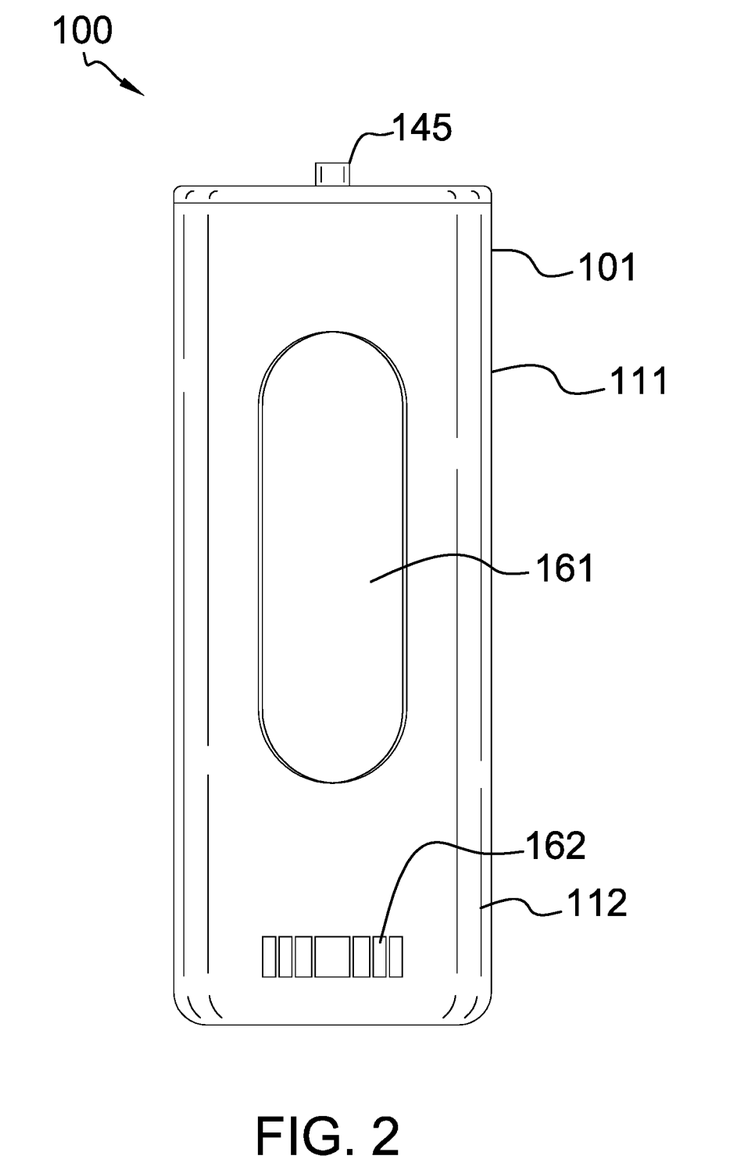
FIG. 2 is a front view of an embodiment of the disclosure.
Figure 3:
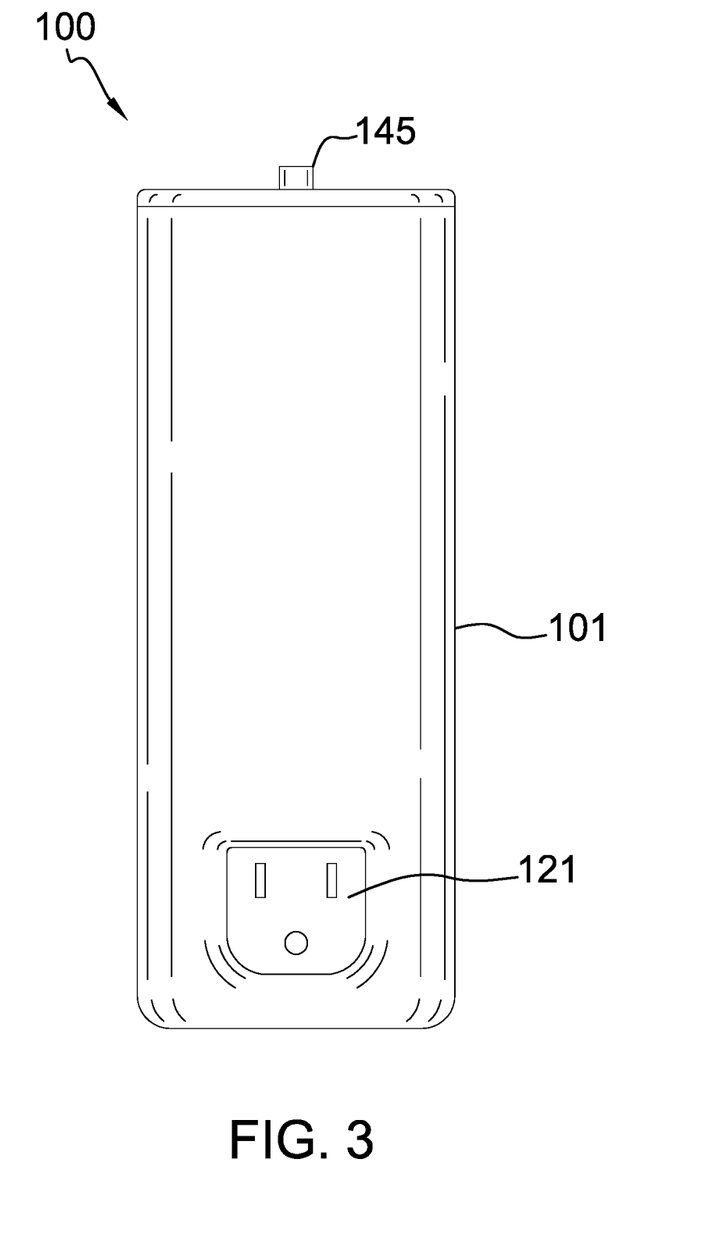
FIG. 3 is a rear view of an embodiment of the disclosure.
Figure 4:
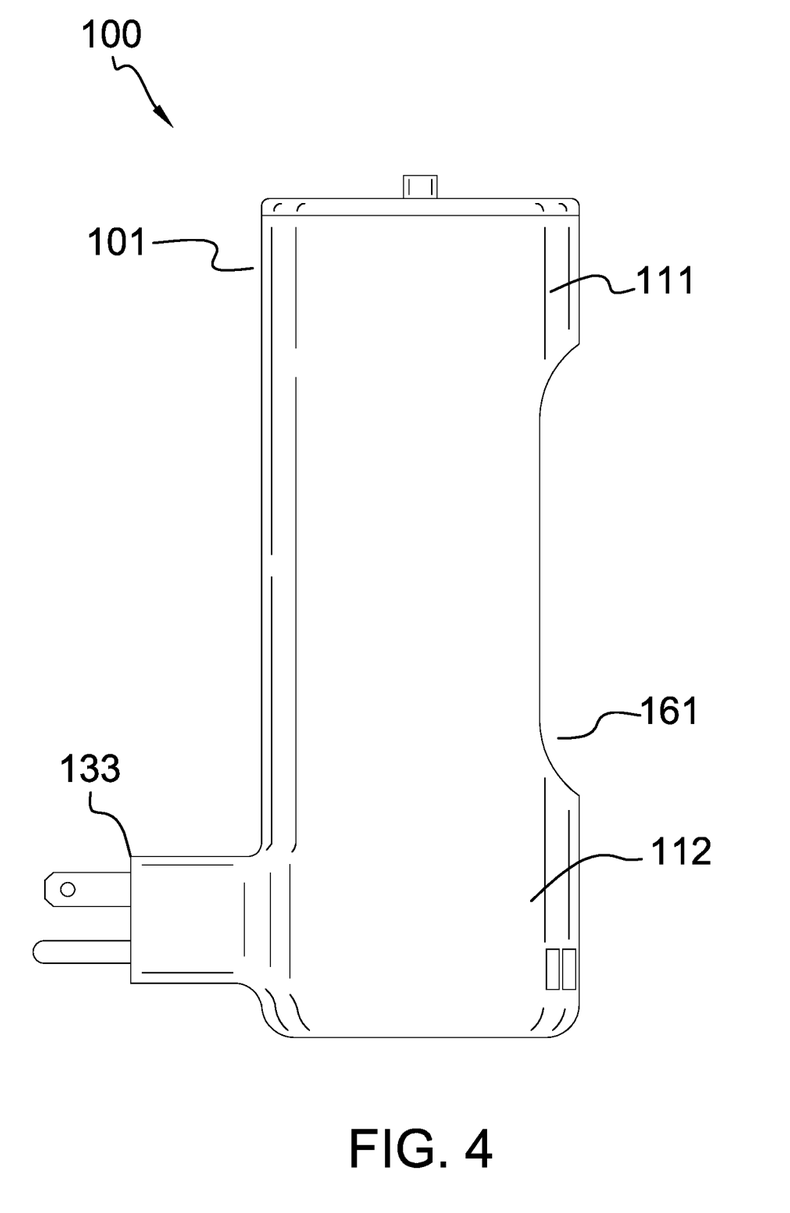
FIG. 4 is a side view of an embodiment of the disclosure.
Figure 5:
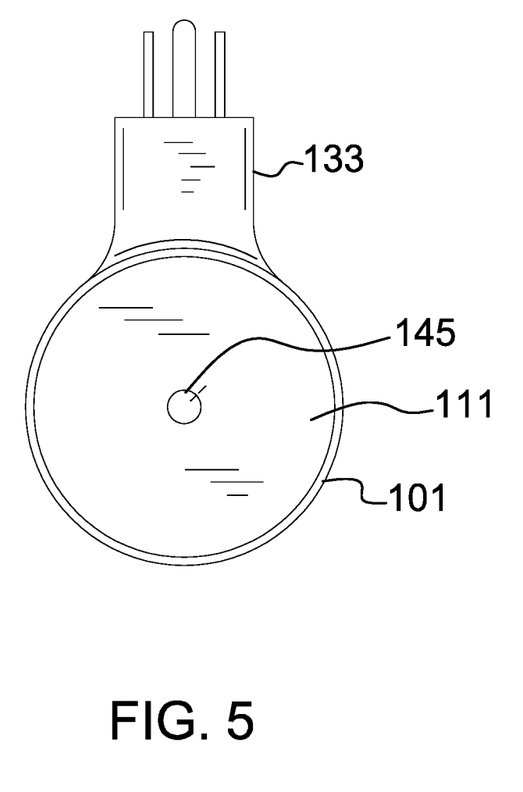
FIG. 5 is a top view of an embodiment of the disclosure.
Figure 6:
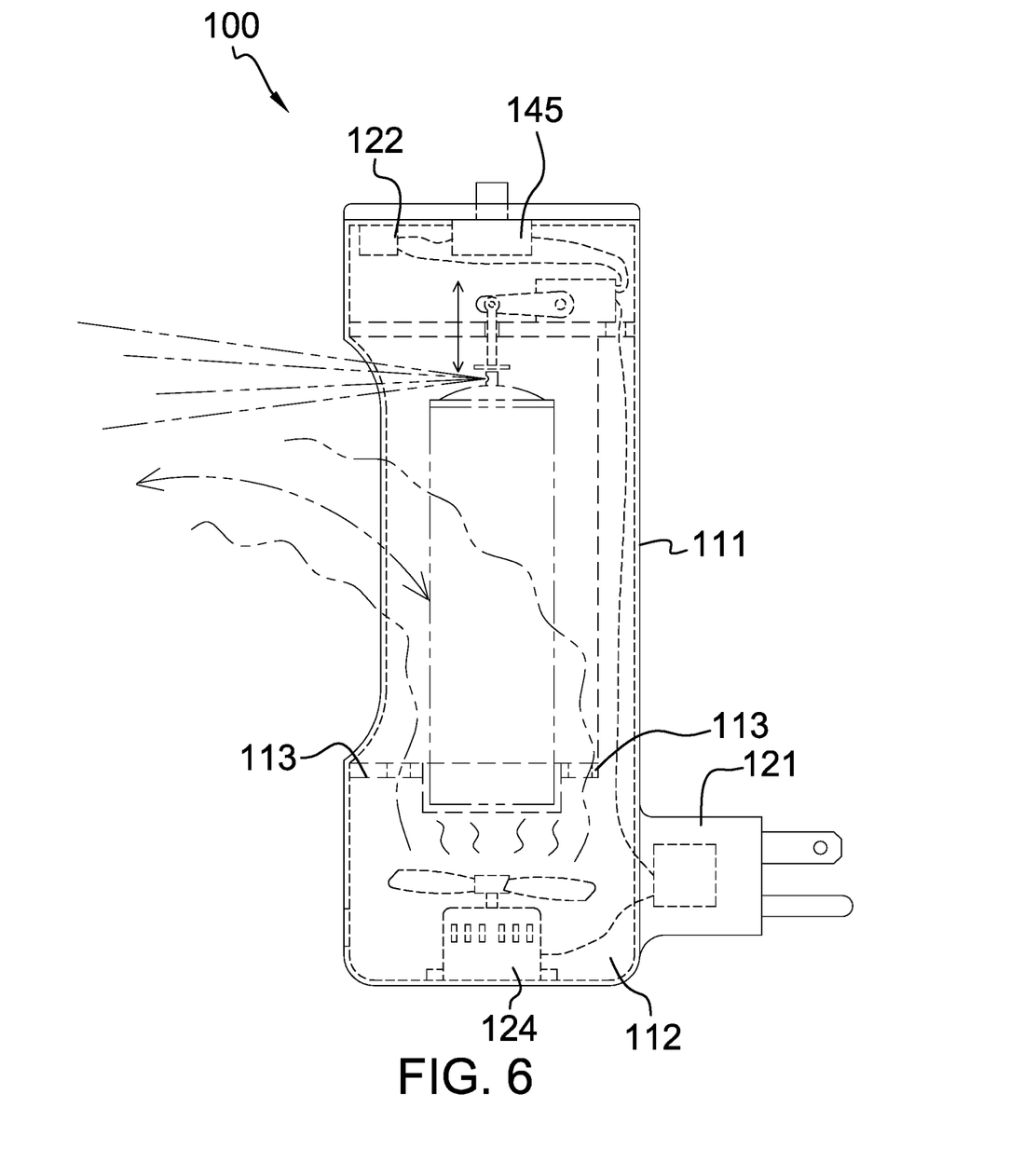
FIG. 6 is a detail view of an embodiment of the disclosure.
Figures 7A, 7B, 7C, 7D:
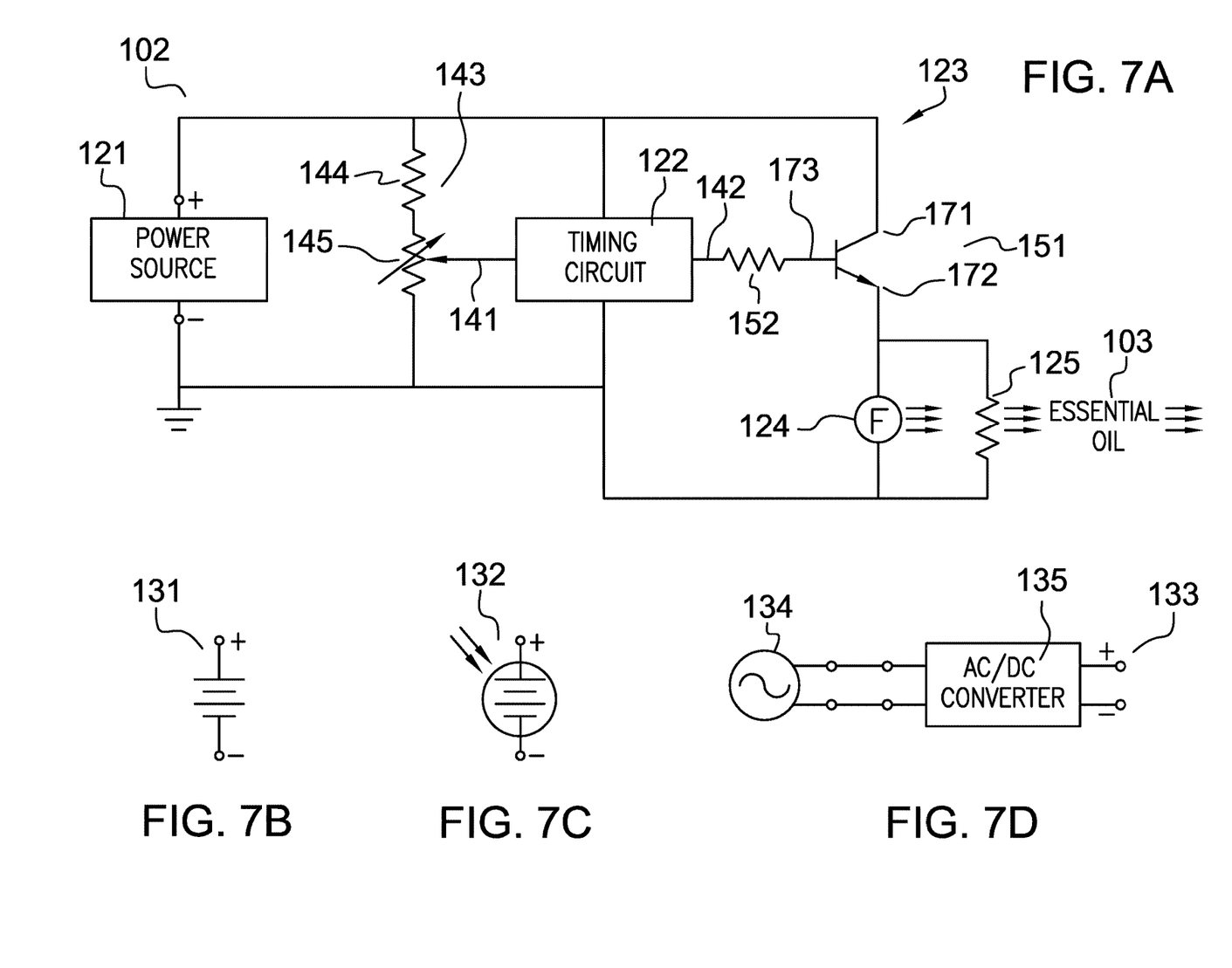
FIG. 7A is a schematic view of an embodiment of the disclosure.
FIG. 7B is a schematic view of an embodiment of the disclosure.
FIG. 7C is a schematic view of an embodiment of the disclosure.
FIG. 7D is a schematic view of an embodiment of the disclosure.

Detailed reference will now be made to one or more potential embodiments of the disclosure, which are illustrated in FIGS. 1 through 7D.

The portable insecticide dispenser 100 (hereinafter invention) is an electromechanical device. The invention 100 vaporizes an insecticide using a method selected from the group consisting of evaporation and sublimation. The invention 100 diffuses the vaporized insecticide into the atmosphere. The invention 100 comprises a master chamber 101, a control circuit 102, and an essential oil 103. The master chamber 101 contains the control circuit 102 and the essential oil 103. The essential oil 103 is a lipid-based substance that contains a substance known to be an insecticide. The control circuit 102 vaporizes the essential oil 103 such that the insecticide forms a gas phase that mixes into the atmosphere. The control circuit 102 further mechanically diffuses the gas phase of the insecticide into the atmosphere.

The essential oil 103 is a lipid based chemical solution. The essential oil 103 contains an insecticide. The insecticide has a lipid based chemical structure. The essential oil 103 is defined elsewhere in this disclosure. In the first potential embodiment of the disclosure, the essential oil 103 is selected from the group consisting of: basil oil, cedar wood oil, citronella oil, chamomile oil, clove oil, lavender oil, lemongrass oil, and peppermint oil.

The master chamber 101 is a mechanical structure. The master chamber 101 forms the housing that contains the control circuit 102 and the essential oil 103. The master chamber 101 is a prism-shaped structure. The master chamber 101 has a composite prism structure. The master chamber 101 is a rigid structure. The master chamber 101 contains the control circuit 102 and the essential oil 103. The master chamber 101 is formed with all apertures and form factors necessary to allow the master chamber 101 to accommodate the use, the operation, and the external connections of the control circuit 102 and the essential oil 103. Methods to form a master chamber 101 suitable for the purposes described in this disclosure are well-known and documented in the mechanical arts. The master chamber comprises a dispersion chamber 111, a circuit chamber 112, and a diffusion disk 113.

The dispersion chamber 111 is a hollow prism-shaped structure. The dispersion chamber 111 has a capped tube structure. The dispersion chamber 111 forms the chamber of the composite prism structure of the master chamber 101 that contains the essential oil 103. The dispersion chamber 111 further comprises an access port 161.

The access port 161 is an aperture formed through the lateral face of the prism structure of the dispersion chamber 111. The access port 161 allows access into the hollow interior of the dispersion chamber 111. The essential oil 103 is placed on the diffusion disk 113 through the dispersion chamber 111. The vaporized essential oil 103 is discharged from the dispersion chamber 111 through the access port 161.

The circuit chamber 112 is a hollow prism-shaped structure. The circuit chamber 112 has a capped tube structure. The circuit chamber 112 forms the chamber of the composite prism structure of the master chamber 101 that contains the control circuit 102. The circuit chamber 112 is geometrically similar to the dispersion chamber 111. The circuit chamber 112 attaches to the dispersion chamber 111 and the diffusion disk 113 to form the composite prism structure of the master chamber 101. The circuit chamber 112 further comprises an intake port 162 and a discharge port 163.

The intake port 162 is a port formed through the lateral face of the prism structure of the circuit chamber 112. The fan 124 draws air from the atmosphere into the circuit chamber 112 through the intake port 162. The discharge port 163 is a plurality of apertures formed through the disk structure of the diffusion disk 113. The discharge port 163 forms the foraminous structure of the diffusion disk 113. The fan 124 pumps atmospheric gas from the circuit chamber 112 into the dispersion chamber 111 through the discharge port 163. The gas flow through the discharge port 163 provides the molecular motion with the atmospheric gases that diffuses the vaporized essential oil 103 into the atmosphere.

The diffusion disk 113 is a prism-shaped structure. The diffusion disk 113 is a disk-shaped structure. The diffusion disk 113 forms a partial barrier between the dispersion chamber 111 and the circuit chamber 112. 121

The diffusion disk 113 forms a saucer that contains the essential oil 103. The diffusion disk 113 is a foraminous structure. The foraminous structure of the diffusion disk 113 forms a fluidic connection between the dispersion chamber 111 and the circuit chamber 112 that aids in the diffusion of the vaporized essential oil 103. The diffusion disk 113 mounts into the interior of the master chamber 101 such that the congruent ends of the disk structure of the diffusion disk 113 are perpendicular to the center axis of the composite prism structure of the master chamber 101.

The control circuit 102 is an electric circuit. The control circuit 102 is a heated structure that vaporizes the essential oil 103 into a gas phase. The control circuit 102 pumps the vaporized essential oil 103 away from the invention 100 such that the vaporized essential oil 103 diffuses into the atmosphere. The control circuit 102 is configured to run cyclically. By running cyclically is meant that the control circuit 102 operates over a cycle such that the control circuit 102 vaporizes and diffuses the vaporized essential oil 103 over a first predetermined period of time. At the end of the first predetermined period of time, the control circuit 102 discontinues the operation for a second predetermined period of time. At the end of the second predetermined period of time, the control circuit 102 reinitiates the operation of the control circuit 102 to vaporize and to diffuse the vaporized essential oil 103 over the subsequent first predetermined period of time.

The control circuit 102 comprises an external power source 121, a timing circuit 122, a relay 123, a fan 124, and a heating element 125. The external power source 121, the timing circuit 122, the relay 123, the fan 124, and the heating element 125 are electrically interconnected.

The external power source 121 is an electric circuit. The external power source 121 is an externally provisioned source of electrical energy used to power the control circuit 102. The external power source 121 is defined elsewhere in this disclosure. The external power source 121 is selected from the group consisting of: a) a battery 131; b) a photovoltaic cell 132; and, c) a domestic power source 133.

The battery 131 is an electrochemical device. The battery 131 converts chemical potential energy into the electrical energy used to power the control circuit 102. The battery 131 is defined elsewhere in this disclosure.

The photovoltaic cell 132 is an electrical device that converts light into the electrical energy used to power the control circuit 102. The photovoltaic cell 132 is defined elsewhere in this disclosure.

The domestic power source 133 is based on a continuously available source of electric energy commonly used within businesses and residences. The domestic power source 133 provides the DC electric energy necessary to operate the control circuit 102. The domestic power source 133 draws energy directly from the national electric grid 134. The domestic power source 133 further comprises a national electric grid 134 and an ac/dc converter 135.

The national electric grid 134 is a commercially provided source of electric energy. The national electric grid 134 is defined elsewhere in this disclosure. The ac/dc converter 135 is an electric circuit. The ac/dc converter 135 converts the ac voltage provided by the national electric grid 134 into a regulated dc voltage by rectifying and regulating the ac voltage. The ac/dc converter 135 is defined elsewhere in this disclosure.

The timing circuit 122 is an electric circuit that implements a timing device used to control the operation of the control circuit 102. The timing circuit 122 initiates the operating cycle such that the timing circuit 122 initiates vaporizing and diffusing the vaporized essential oil 103 over the first predetermined period of time. At the end of the first predetermined period of time, the timing circuit 122 discontinues the operation of the control circuit 102 for the second predetermined period of time. At the end of the second predetermined period of time, the timing circuit 122 reinitiates the operation of the control circuit 102 to vaporize and to diffuse the vaporized essential oil 103 over the subsequent first predetermined period of time. In the first potential embodiment of the disclosure, the timing circuit 122 is based on a "555" circuit. The timing circuit 122 is defined elsewhere in this disclosure.

The timing circuit 122 further comprises an input 141, an output 142, and a voltage divider 143.

The input 141 is an electrical connection between the timing circuit 122 and the voltage divider 143. The timing circuit 122 electrically connects to the potentiometer 145 of the voltage divider 143 such that the timing circuit 122 measures the voltage across the potentiometer 145. The voltage measured by the timing circuit 122 through the input 141 sets the first predetermined period of time and the second predetermined period of time measured by the timing circuit 122.

The output 142 is an electrical connection between the timing circuit 122 and the relay 123. The output 142 controls the operation of the relay 123. The output 142 transmits an electrical signal to the relay 123 that initiates an action selected from the group consisting of: a) actuating the relay 123 from an open position to a closed position; and b), actuating the relay 123 from a closed position to an open position.

The voltage divider 143 is an electric circuit that divides a voltage into two smaller voltages. One of these smaller voltages is monitored by the input 141 of the timing circuit 122. The value of the voltage presented to the input 141 by the voltage divider 143 is a function of the resistance to which the potentiometer 145 is set. The voltage divider 143 is defined elsewhere in this disclosure. The voltage divider 143 further comprises a pull up resistor 144 and a potentiometer 145.

The pull up resistor 144 is an electric circuit element known as a resistor. The pull up resistor 144 electrically connects in series with the potentiometer 145. The pull up resistor 144 acts as a load resistor. The load absorbed by the pull up resistor 144 allows the voltage divider 143 to appropriately adjust to the voltage changes across the potentiometer 145 that occur as the resistance presented by the potentiometer 145 to the timing circuit 122 changes. The pull up resistor 144 is defined elsewhere in this disclosure.

The potentiometer 145 is an electric circuit element. The potentiometer 145 is a variable resistor. The potentiometer 145 is adjustable. The potentiometer 145 adjusts such that the resistance presented to an electric circuit can be adjusted. The voltage monitored by the timing circuit 122 is measured across the potentiometer 145. The potentiometer 145 is defined elsewhere in this disclosure.

The relay 123 is an electrically controlled electric switch. The operation of the relay 123 is controlled by an electric signal generated by the timing circuit 122. The relay 123 forms a switched electric connection between the fan 124 and the external power source 121. The relay 123 forms a switched electric connection between the heating element 125 and the external power source 121. The relay 123 controls the operation of the fan 124. The relay 123 controls the operation of the heating element 125. The relay 123 is defined elsewhere in this disclosure. In the first potential embodiment of the disclosure, the relay 123 comprises a transistor 151 and a limit resistor 152.

The transistor 151 electrically connects the external power source 121 to the fan 124 and the heating element 125. The transistor 151 controls the flow of electricity from the external power source 121 to the fan 124 and the heating element 125. The output 142 of the timing circuit 122 controls the actuation of the transistor 151. The transistor 151 is defined elsewhere in this disclosure. The transistor 151 further comprises a collector 171, an emitter 172, and a base 173.

The transistor 151 operates as a switch. When a voltage is applied to the base 173, current will flow into the base 173 and the transistor 151 will act like a closed switch allowing current to flow from the collector 171 to the emitter 172. When the voltage is removed from the base 173, the transistor 151 will act like an open switch disrupting current flow from the collector 171 to the emitter 172. The collector 171 is the lead of the transistor 151 that electrically connects to the external power source 121. The emitter 172 is the lead of the transistor 151 that electrically connects to both the fan 124 and the heating element 125. The base 173 electrically connects to the output 142 of the timing circuit 122 through the limit resistor 152.

The limit resistor 152 is an electric circuit element that electrically connects the output 142 of the timing circuit 122 to the base 173 of the transistor 151. The limit resistor 152 limits the flow of electricity from the output 142 into the base 173. The limit resistor 152 is defined elsewhere in this disclosure.

The fan 124 is a bladed electrically powered device. The fan 124 pumps air into the circuit chamber 112 through the intake port 162 of the circuit chamber 112. The fan 124 pumps air into the circuit chamber 112 through the discharge port 163 of the diffusion disk 113. The pressure differential generated by the fan 124 forces the vaporized essential oil 103 through the access port 161 into the atmosphere. The fan 124 is defined elsewhere in this disclosure.

The heating element 125 is an electric circuit element. The heating element 125 is a resistance based device that generates heat when electricity passes through the heating element 125. The heating element 125 is positioned such that the heat generated by the heating element 125 heats the essential oil 103 contained within the master chamber 101. The heat generated by the heating element 125 vaporizes the essential oil 103 in preparation for diffusion by the fan 124. The heating element 125 is defined elsewhere in this disclosure.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Battery: As used in this disclosure, a battery is a chemical device consisting of one or more cells, in which chemical energy is converted into electricity and used as a source of power. Batteries are commonly defined with a positive terminal and a negative terminal.

Capped Tube: As used in this disclosure, a capped tube is a tube with one closed end and one open end.

Cavity: As used in this disclosure, a cavity is an empty space or negative space that is formed within an object. See Saucer Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

DC: As used in this disclosure, DC is an acronym for direct current.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Essential Oil: As used in this disclosure, an essential oil is a lipid based solution that contains one or more volatile aroma compounds. Examples of naturally occurring essential oils include, but are not limited to, basil oil, black pepper oil, caraway oil, *cannabis* flower oil, cedar wood oil, cinnamon oil, citronella oil, chamomile oil, clove oil, davana oil, *eucalyptus* oil, frankincense oil, horseradish oil, jasmine oil, lavender oil, lemon oil, lemongrass oil, mandarin oil, nutmeg oil, orange oil, oregano oil, peppermint oil, pine oil, sage oil, sandalwood oil, star anise oil, and thyme oil. Basil oil, cedar wood oil, citronella oil, chamomile oil, clove oil, lavender oil, lemongrass oil, and peppermint oil are traditionally considered to have insect repellent and insecticide properties.

Evaporation: As used in this disclosure, evaporation refers to the phase transition of a compound from a liquid phase to a gas phase.

External Power Source: As used in this disclosure, an external power source is a source of the energy that is externally provided to enable the operation of the present disclosure. Examples of external power sources include, but are not limited to, electrical power sources and compressed air sources.

Fan: As used in this disclosure, a fan is a pump that moves a gas. The first potential embodiment of this disclosure assumes that the fan is a mechanical device with rotating blades that is used to create a flow or current of a gas.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grille: As used in this disclosure, a grille is a cover that forms a barrier that allows for the passage of gas through the grille while preventing solid items from passing through the grille.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Housing: As used in this disclosure, a housing is a rigid structure that encloses and protects one or more devices.

Limit Resistor: As used in this disclosure, a limit resistor is an electrical resistor that is used to limit the flow of electric current through an electrical circuit.

Lipid: As used in this disclosure, a lipid is an organic molecule that is soluble in nonpolar solvents.

Liquid: As used in this disclosure, a liquid refers to a state (phase) of matter that is fluid and that maintains, for a given pressure, a fixed volume that is independent of the volume of the container.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter.

Negative Space: As used in this disclosure, negative space is a method of defining an object through the use of open or empty space as the definition of the object itself, or, through the use of open or empty space to describe the boundaries of an object.

Normal Temperature and Pressure: As used in this disclosure, normal temperature and pressure refers to gas storage conditions corresponding to 20 degrees C. at 100 kPa (approx. 1 atmosphere). Normal temperature and pressure is often abbreviated as NTP.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Organic: As used in this disclosure, organic refers to a carbon-based chemical structure. A limited number of (mostly) carbon-based salts are traditionally considered inorganic chemical structures and are excluded from the study of organic chemistry.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Photovoltaic Cell: As used in this disclosure, a photovoltaic cell is a photoelectric device that directly converts light energy into electrical energy.

Port: As used in this disclosure, a port is an aperture formed in an object that allows fluid to flow through the boundary of the object.

Potentiometer: As used in this disclosure, a potentiometer is an adjustable electrical device that presents a resistance to a voltage. The level of resistance is adjustable.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pull-Up Resistor: As used in this disclosure, a pull-up resistor is an electrical resistor that is used to: 1) limit the current flow through a switching device; and, 2) to control the voltage level presented across a switch, a load resistor, or a pull-down resistor.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Regulated Voltage: As used in this disclosure, a regulated voltage refers to a source of DC voltage that incorporates circuitry that reduces changes in output voltages that occur in response to changes to the circuit's input power supply voltage or to changes in output, or load, current.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Resistance: As used in this disclosure, resistance refers to the opposition provided by an electrical circuit (or circuit element) to the electrical current created by a DC voltage is presented across the electrical circuit (or circuit element). The term impedance is often used when referring to an AC voltage is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Saucer: As used in this disclosure, a saucer is a cavity or depression that is formed in a surface such that: 1) an object may be placed within the cavity or depression; and, 2) the cavity or depression prevents the position of the object from shifting when the surface is moved.

Solid: As used in this disclosure, a solid refers to a state (phase) of matter that: 1) has a fixed volume; and, 2) does not flow.

Solution: As used in this disclosure, a solution is a uniform mixture of two or more compounds in a liquid phase. The major component selected of the solution selected from the two or more compounds is called the solvent. The components remaining in the two or more compounds are called the solute.

Sublimation: As used in this disclosure, sublimation refers to a phase transition directly from a solid phase to a gas phase in a manner that bypasses the liquid phase.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Tube: As used in this disclosure, the term tube is used to describe a rigid hollow prism-shaped device with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Volatile: As used in this disclosure, volatile refers to a substance that will evaporate or sublimate into a gas state at normal temperature and pressure.

Volatile Organic Compounds: As used in this disclosure, a volatile organic compounds refers to an organic compounds with a relatively low boiling point such that a significant portion of the volatile organic compounds will exist as a gas at normal temperature and pressure. Volatile organic compounds is commonly abbreviated VOC. When measuring volatile organic compounds within the atmosphere, commercially available sensors will generally measure and report all volatile organic compounds as a single aggregated measurement referred to as the total volatile organic compounds. Total volatile organic compounds is commonly abbreviated TVOC.

Voltage Divider: As used in this disclosure, a voltage divider is an electric circuit that comprises a plurality of resistors electrically connected in series. The voltage divider divides a voltage presented across the plurality of resistors into one or more smaller voltages that can be used elsewhere in an electric circuit. The value of the one or more smaller voltages presented by the voltage divider is controlled through the selection of the value of each of the plurality of resistors.

With respect to the above description, it is to be realized that the optimum dimensional relationship for the various components of the invention described above and in FIGS. 1 through 7D include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An insecticide dispenser comprising a master chamber, a control circuit, and an essential oil;

wherein the master chamber contains the control circuit and the essential oil;

wherein the essential oil is a lipid-based substance that contains an insecticide;

wherein the control circuit is configured to vaporize the essential oil such that the insecticide forms a gas phase that mixes into the atmosphere;

wherein the insecticide dispenser is configured to diffuse the vaporized insecticide into the atmospheres wherein the master chamber comprises a dispersion chamber, a circuit chamber, and a diffusion disk;

wherein the circuit chamber further comprises an intake port and a discharge port;

wherein the intake port is a port formed through the lateral face of the prism structure of the circuit chamber;

wherein a fan is configured to draw air from the atmosphere into the circuit chamber through the intake port; wherein the discharge port is a plurality of apertures formed through the disk structure of the diffusion disk;

wherein the discharge port forms the foraminous structure of the diffusion disk;

wherein the fan is configured to pump atmospheric gas from the circuit chamber into the dispersion chamber through the discharge port;

wherein when in use, the gas flow through the discharge port provides the molecular motion with the atmospheric gases that diffuses the vaporized essential oil into the atmosphere.

2. The insecticide dispenser according to claim 1 wherein the insecticide dispenser is an electromechanical device;

wherein the insecticide dispenser is configured to vaporize an insecticide and when in use vaporizes by evaporation or sublimation;

wherein the control circuit is further configured to mechanically diffuse the gas phase of the insecticide into the atmosphere;

wherein the essential oil is a lipid based chemical solution;

wherein the essential oil contains an insecticide;

wherein the insecticide has a lipid based chemical structure.

3. The insecticide dispenser according to claim 2 wherein the master chamber is a mechanical structure;

wherein the master chamber forms a housing that contains the control circuit and the essential oil;

wherein the master chamber is a prism-shaped structure;

wherein the master chamber has a composite prism structure;

wherein the master chamber is a rigid structure.

4. The insecticide dispenser according to claim 3 wherein the control circuit is an electric circuit;

wherein the control circuit is a heated structure that is configured to vaporize the essential oil into a gas phase;

wherein the control circuit is configured to pump the vaporized essential oil away from the insecticide dispenser such that when in use the vaporized essential oil diffuses into the atmosphere.

5. The insecticide dispenser according to claim 4 wherein the control circuit is configured to run cyclically;

wherein by running cyclically is meant that the control circuit operates over a cycle such that when in use the Control circuit vaporizes and diffuses the vaporized essential oil over a first predetermined period of time;

wherein at the end of the first predetermined period of time, the control circuit is configured to discontinue the operation for a second predetermined period of time;

wherein at the end of the second predetermined period of time, the control circuit is configured to reinitiate the operation of the control circuit to vaporize and to diffuse the vaporized essential oil over the subsequent first predetermined period of time.

6. The insecticide dispenser according to claim 5 wherein the dispersion chamber, the circuit chamber, and the diffusion disk are joined to form the composite prism structure.

7. The insecticide dispenser according to claim 6 wherein the control circuit comprises an external power source, a timing circuit, a relay, the fan, and a heating element;

wherein the external power source, the timing circuit, the relay, the fan, and the heating element are electrically interconnected.

8. The insecticide dispenser according to claim 7 wherein the dispersion chamber is a hollow prism-shaped structure;

wherein the dispersion chamber has a capped tube structure;

wherein the dispersion chamber forms the chamber of the composite prism structure of the master chamber that contains the essential oil.

9. The insecticide dispenser according to claim 8 wherein the dispersion chamber further comprises an access port;

wherein the access port is an aperture formed through the lateral face of the prism structure of the dispersion chamber;

wherein the access port is configured to allow access into the hollow interior of the dispersion chamber;

wherein the essential oil in use is placed on the diffusion disk through the dispersion chamber;

wherein in use the vaporized essential oil discharges from the dispersion chamber through the access port.

10. The insecticide dispenser according to claim 9 wherein the circuit chamber is a hollow prism-shaped structure;

wherein the circuit chamber has a capped tube structure;

wherein the circuit chamber forms the chamber of the composite prism structure of the master chamber that contains the control circuit;

wherein the circuit chamber is geometrically similar to the dispersion chamber;

wherein the circuit chamber is configured to attach to the dispersion chamber and the diffusion disk to form the composite prism structure of the master chamber.

11. The insecticide dispenser according to claim 10 wherein the diffusion disk is a prism-shaped structure;

wherein the diffusion disk is a disk-shaped structure;

wherein the diffusion disk forms a partial barrier between the dispersion chamber and the circuit chamber;

wherein the diffusion disk forms a saucer that contains the essential oil.

12. The insecticide dispenser according to claim 11 wherein the diffusion disk is a foraminous structure;

wherein the foraminous structure of the diffusion disk is configured to form a fluidic connection between the dispersion chamber and the circuit chamber that aids in the diffusion of the vaporized essential oil;

wherein the diffusion disk mounts into the interior of the master chamber such that the congruent ends of the disk structure of the diffusion disk are perpendicular to the center axis of the composite prism structure of the master chamber.

13. The insecticide dispenser according to claim 12 wherein the external power source is an electric circuit;

wherein the external power source is an externally provisioned source of electrical energy used to power the control circuit;

wherein the external power source is selected from the group consisting of:
a) a battery;
b) a photovoltaic cell; and,
c) a domestic power source;

wherein the battery is an electrochemical device;

wherein the battery is configured to convert chemical potential energy into the electrical energy used to power the control circuit;

wherein the photovoltaic cell is an electrical device that is configured to convert light into the electrical energy used to power the control circuit;

wherein the domestic power source is based on a continuously available source of electric energy;

wherein the domestic power source provides the electric energy necessary to operate the control circuit;

wherein the domestic power source further comprises a national electric grid and an ac/dc converter;

wherein the domestic power source draws energy directly from the national electric grid;

wherein the ac/dc converter is an electric circuit;

wherein the ac/dc converter converts the ac voltage provided by the national electric grid into a regulated dc voltage by rectifying and regulating the ac voltage.

14. The insecticide dispenser according to claim 13 wherein the timing circuit is an electric circuit comprising a timing device configured to control the operation of the control circuit;

wherein the timing circuit when in use initiates the operating cycle such that the timing circuit is configured to initiate vaporization and then diffusion of the vaporized essential oil over the first predetermined period of time;

wherein at the end of the first predetermined period of time, the timing circuit is configured to discontinue the operation of the control circuit for the second predetermined period of time;

wherein at the end of the second predetermined period of time, the timing circuit is configured to reinitiate the operation of the control circuit to vaporize and to diffuse the vaporized essential oil over the subsequent first predetermined period of time;

wherein the timing circuit further comprises an input, an output, and a voltage divider;

wherein the input is an electrical connection between the timing circuit and the voltage divider;

wherein the timing circuit electrically connects to the potentiometer of the voltage divider such that when in use the timing circuit is configured to measure the voltage across the potentiometer;

wherein the voltage measured by the timing circuit through the input is configured to set the first predetermined period of time and the second predetermined period of time measured by the timing circuit;

wherein the output is an electrical connection between the timing circuit and the relay;

wherein the output controls the operation of the relay;

wherein the output is configured to transmit an electrical signal to the relay that when in use initiates an action selected from the group consisting of:
  a) actuating the relay from an open position to a closed position; and
  b) actuating the relay from a closed position to an open position;

wherein the voltage divider is an electric circuit that divides a voltage into two smaller voltages;

wherein one of these smaller voltages is configured to be monitored by the input of the timing circuit;

wherein the voltage divider further comprises a pull up resistor and a potentiometer;

wherein the pull up resistor is an electric circuit element known as a resistor;

wherein the pull up resistor electrically connects in series with the potentiometer;

wherein the pull up resistor when in use acts as a load resistor;

wherein the load absorbed by the pull up resistor is configured to allow the voltage divider to appropriately adjust to the voltage changes across the potentiometer that when in use occurs as the resistance presented by the potentiometer to the timing circuit changes;

wherein the value of the voltage presented to the input by the voltage divider is a function of the resistance to which the potentiometer is set;

wherein the potentiometer is an electric circuit element;

wherein the potentiometer is a variable resistor;

wherein the potentiometer is adjustable;

wherein the potentiometer adjusts such that the resistance presented to an electric circuit can be adjusted.

15. The insecticide dispenser according to claim 14
wherein the relay is an electrically controlled electric switch;

wherein the operation of the relay is configured to be controlled by an electric signal generated by the timing circuit;

wherein the relay is configured to form a switched electric connection between the fan and the external power source;

wherein the relay is configured to form a switched electric connection between the heating element and the external power source;

wherein the relay is configured to control the operation of the fan;

wherein the relay is configured to control the operation of the heating element.

16. The insecticide dispenser according to claim 15
wherein the relay comprises a transistor and a limit resistor;

wherein the transistor is configured to electrically connect the external power source to the fan and the heating element;

wherein the transistor is configured to control the flow of electricity from the external power source to the fan and the heating element;

wherein the output of the timing circuit is configured to control the actuation of the transistor;

wherein the limit resistor is an electric circuit element that is configured to electrically connect the output of the timing circuit to the base of the transistor.

17. The insecticide dispenser according to claim 16
wherein the fan is a bladed electrically powered device;

wherein the fan is configured to pump air into the circuit chamber through the intake port of the circuit chamber;

wherein the fan is configured to pump air into the circuit chamber through the discharge port of the diffusion disk;

wherein when in use a pressure differential generated by the fan forces the vaporized essential oil through the access port into the atmosphere;

wherein the heating element is an electric circuit element;

wherein the heating element is a resistance based device that is configured to generate heat when electricity passes through the heating element;

wherein the heating element is positioned such that when in use the heat generated by the heating element heats the essential oil contained within the master chamber;

wherein the heat generated by the heating element is configured to vaporize the essential oil in preparation for diffusion by the fan.

18. The insecticide dispenser according to claim 17
wherein the transistor further comprises a collector, an emitter, and a base;

wherein the transistor is configured to operate as a switch;

wherein when a voltage is applied to the base, a current is configured to flow into the base and the transistor when in use will act like a closed switch allowing current to flow from the collector to the emitter;

wherein when the voltage is removed from the base, the transistor is configured to act like an open switch disrupting current flow from the collector to the emitter;

wherein the collector is the lead of the transistor that is configured to electrically connect to the external power source;

wherein the emitter is the lead of the transistor that is configured to electrically connect to both the fan and the heating element;

wherein the base is configured to electrically connect to the output of the timing circuit through the limit resistor;

wherein the limit resistor is configured to limit the flow of electricity from the output into the base.

19. The insecticide dispenser according to claim 18 wherein the essential oil is selected from the group consisting of: basil oil, cedar wood oil, citronella oil, chamomile oil, clove oil, lavender oil, lemongrass oil, and peppermint oil.

* * * * *